(12) United States Patent
Chenowth

(10) Patent No.: US 7,236,096 B2
(45) Date of Patent: Jun. 26, 2007

(54) SLOPE DETECTOR

(76) Inventor: Lynn Chenowth, 1404 N. Marshall Ave., El Cajon, CA (US) 92020

( * ) Notice: Subject to any disclaimer, the term of this patent is extended or adjusted under 35 U.S.C. 154(b) by 219 days.

(21) Appl. No.: 11/136,919

(22) Filed: May 24, 2005

(65) Prior Publication Data

US 2006/0267749 A1    Nov. 30, 2006

(51) Int. Cl.
    *G08B 21/00*    (2006.01)
(52) U.S. Cl. .................. 340/689; 340/686.1; 340/680; 340/685; 340/686.3; 200/339
(58) Field of Classification Search .................. None
    See application file for complete search history.

(56) References Cited

U.S. PATENT DOCUMENTS

| | | | | |
|---|---|---|---|---|
| 2,803,716 A | * | 8/1957 | Nolden et al. | 200/43.08 |
| 3,629,530 A | * | 12/1971 | Fischer | 200/43.08 |
| 4,121,071 A | * | 10/1978 | Campbell et al. | 200/437 |
| 4,293,026 A | * | 10/1981 | Day | 165/111 |
| 4,401,178 A | * | 8/1983 | Studer | 180/8.2 |
| 4,571,467 A | * | 2/1986 | Sorenson et al. | 200/6 BA |
| 4,771,233 A | * | 9/1988 | Wayne | 324/99 R |
| 5,769,209 A | * | 6/1998 | Massey, III | 200/339 |
| 5,834,716 A | * | 11/1998 | Lee | 200/5 R |
| 6,003,887 A | * | 12/1999 | Howard | 280/89.11 |
| 6,249,984 B1 | | 6/2001 | Barsky | |
| 6,546,724 B2 | * | 4/2003 | Nishimura et al. | 60/431 |
| 6,956,179 B2 | * | 10/2005 | Gillman et al. | 200/302.3 |

* cited by examiner

*Primary Examiner*—Benjamin C. Lee
*Assistant Examiner*—Son Tang
(74) *Attorney, Agent, or Firm*—Charmasson, Buchaca & Leach, LLP

(57) ABSTRACT

In a dump truck where a monitoring system prevents the raising of the cargo bed when the level of lateral tilt exceeds a safe limit, a keyed switch allows for presetting the maximum safe degree of tilt by simple left or right manipulation of the switch, and to switch the display from current level of left or right tilt to the value of the preset limit.

6 Claims, 2 Drawing Sheets

SLOPE DETECTOR

FIELD OF THE INVENTION

This invention relates to switches and other control interfaces between humans and machines, and more particularly to manipulable control devices used in trucks and other outdoor working environments.

BACKGROUND

In signal monitoring and limit detection systems used in industrial settings, the presetting of safety limits is often accomplished by a variety of dials or thumbwheel switches that require time and a certain degree of manual dexterity not always available to workers that may be wearing gloves or other protective equipment. The instant invention results from an attempt to allow the operator of a dump truck to monitor the degree of lateral tilt in a vehicle and check it against a predetermined safe limit without having to manipulate complex or delicate switching and adjusting implements.

SUMMARY

In a signal monitoring and limit detection system in which the current value of an incoming signal, such as the degree of lateral tilt of a dump truck, is constantly monitored and compared to a preset safety limit value before the cargo container is lifted to a dumping position, the setting of the safety limit, as well as the switching of a numerical indicator from the display of the current level of tilt to that of the preset limit, is accomplished by the simple left or right manipulation of a selector switch that only requires a low amount of dexterity. In some embodiments the selector switch is keyed to allow restricted access to actuation of the switch. The adjustment of the safe limit value is accomplished by holding the switch in an increasing or decreasing position until the safety limit is raised by discreet increments to the desired value.

The monitoring system can be disabled, and the truck bed allowed to be raised regardless of the amount of lateral tilt of the truck, by raising the tilt limit beyond a maximum level value.

DESCRIPTION OF THE PREFERRED EMBODIMENTS

Figure 1:
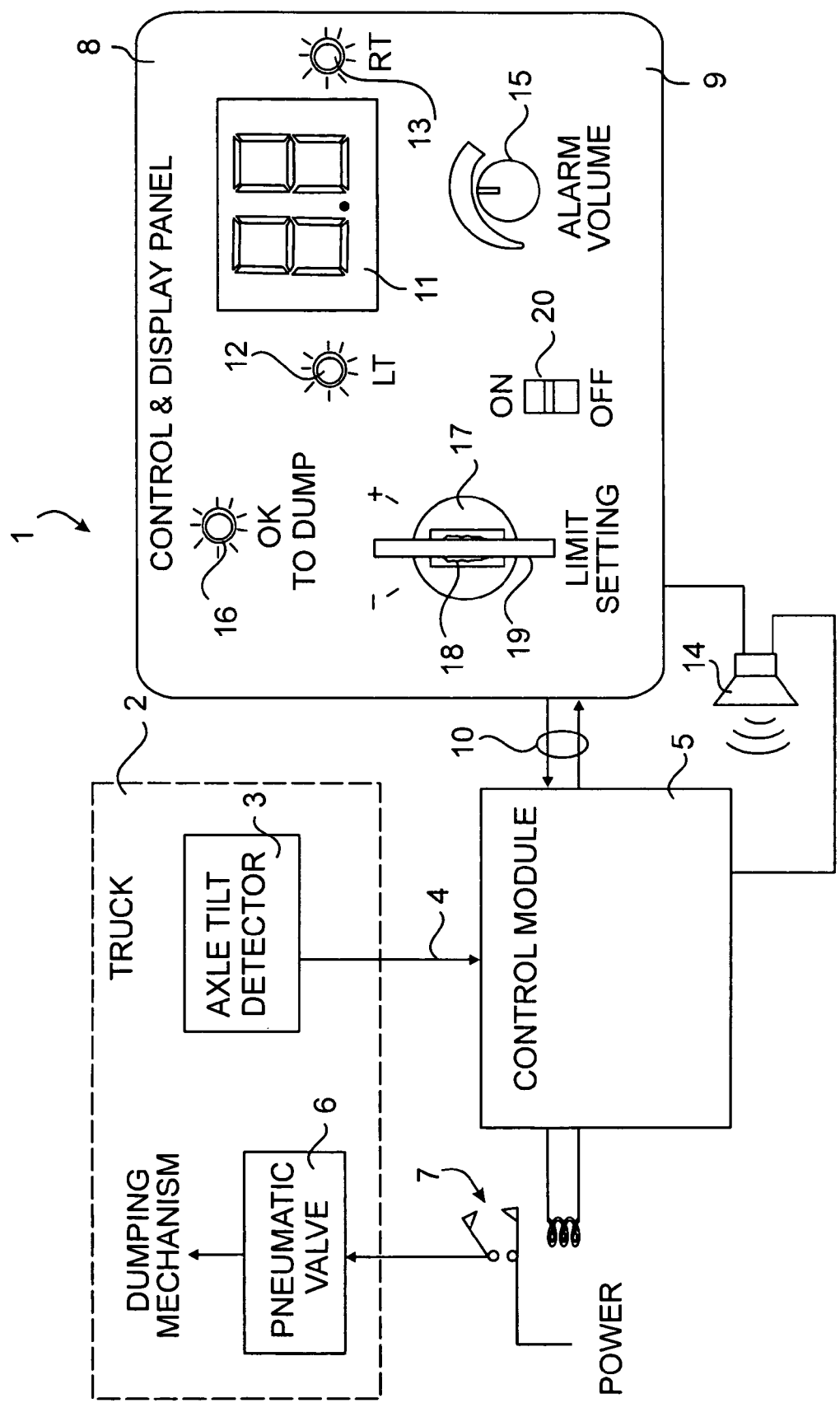
FIG. 1 is a block diagram of a dump truck axle tilt monitoring system according to the invention.

Referring now to the drawing, the instant invention will be described in connection with a dump truck having a tilt signal monitoring and exceeded limit detecting system 1. Mounted on one axle of a truck 2 is a slope or tilt detector 3. The tilt detector is capable of measuring the lateral tilt of the truck up to 60 degrees left and right. It should be noted that such a high degree of tilt is typically only utilized in a controlled factory setting such as during testing. In the field, much lower degrees of tilt are to be detected. Such detector is commonly used in wheel alignments, navigation systems, joysticks and other game implements as well as on various monitoring instruments. Such a type of tilt sensor is disclosed in Barsky, U.S. Pat. No. 6,249,984, which patent is incorporated in this Specification by this reference. The tilt indicator is commercially available from The Fredericks Company of Huntingdon Valley, Pa.

The tilt indicator emits a bi-polar signal 4 which is fed to an electronic control module 5.

Also installed on the truck 2 is a pneumatic valve 6 through which is processed the air line that controls the truck dumping mechanism. A normally open relay 7 associated with the control module 5 controls the supply of power to the pneumatic valve 6. Those skilled in the art will readily appreciate that the "normal" state of the relay can be selected to be either "open" or "closed", and that activation of the relay from its "normal" state can be used to trigger various events in the system. In this embodiment the "normal" state has been selected to be "open". When the relay is open, the pneumatic valve and the dumping mechanism are disabled. A control and display panel 9 preferably mounted on the dashboard of the truck receives and transmits data and control signals 10 from and to the control module 5. A two-digit numerical display 11 indicates the degree of tilt measured by the tilt detector 3 and interpreted by the control module 5. A pair of light indicators 12, 13 are lit alternately to signal a left or right tilt, respectively. The numerical display 11 can also be used to indicate a maximum safety limit value of tilt as will be explained below. An audio alarm 14 whose volume is controlled by a knob 15 on the panel is energized when the safety limit value has been exceeded. The status of the relay 7 is also shown by a light indicator 16 on the panel, and signals when it is safe to operate the dumping mechanism. A limit-setting switch 17 having a keyed hole 18 and being operated by an insertable and removable key 19 can assume three positions. In the central and neutral position shown on the drawing, the switch is inactive. The switch is biased to resiliently return to this neutral position unless it is forcibly and manually held in one of the right position indicated by a plus sign or the left position indicated by a minus sign. A power interrupter 20 which controls the power supply to the tilt detector 3, control module 5, control panel 9, and audio alarm 14 completes the human interface of the control and display panel.

Figure 2:
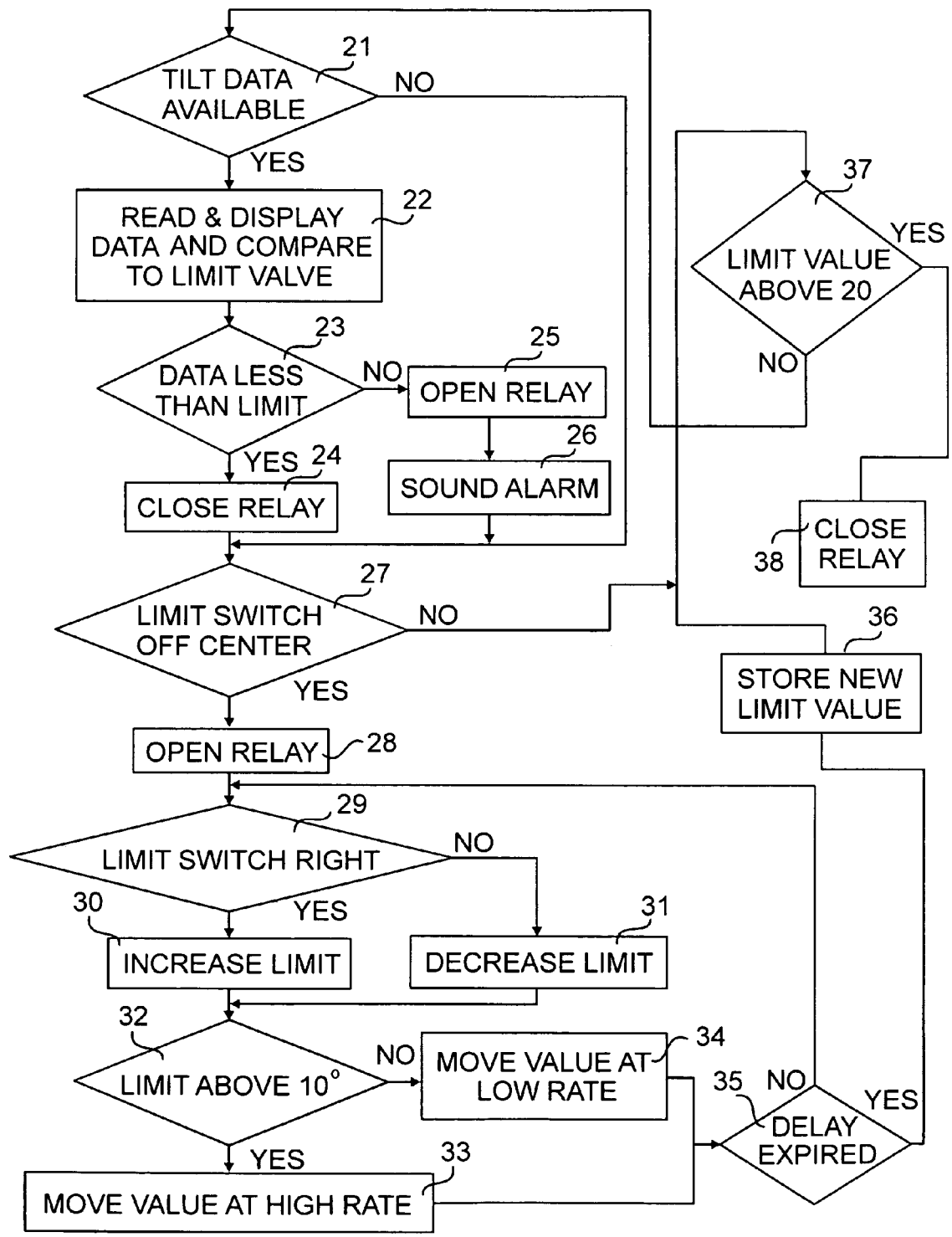
FIG. 2 is a flow diagram of the control module operation.

The control module 5 contains a conventional microprocessor and associated circuitry which operate the system according to a program illustrated in the flow diagram of FIG. 2. The data coming from the tilt detector 3 is constantly being monitored 21 and displayed 22 on the numerical indicator 11 before being compared to the preset limit value. If that value is not reached 23, the relay 7 is kept closed 24 allowing operation of the pneumatic valve and dump mechanism. If the limit value has been reached, the relay is open 25, and the audio alarm is sounded 26. The opening of the relay immediately disables the dumping mechanism. The control module also monitors the position of the limit switch 27 and detects whether it has been moved off center into the plus or minus position. Since the manipulation of the switch indicates that a new limit value is being set and for safety purpose the relay 7 is open 28 to interrupt any dumping operation. The program next detects 29 in which direction the switch has been turned. If the key has been turned toward the right, the limit value is increased 30. If the switch has been turned toward the left, the limit value is decreased 31.

Two rates of increase are used, depending whether or not the limit value is within or above 10 degrees. If the limit value is within 10 degrees 32, it is moved 33 either upward or downward in discrete increments of $\frac{1}{10}$ of a degree at periodical intervals of one second each. If the 10 degree limit value has been exceeded, it is stepped up 34 by discrete increments of one degree each every one second or any other convenient interval of time. After a five-second delay has expired 35 following the return of the switch to the central, neutral position, the new limit value is stored 36.

The program then verifies that the limit value has not been set above 20 degrees 37. If so, this is taken as an indication that the operator wants to disable the monitoring system, and the relay 7 is closed 38. If the limit value is not above 20 degrees or if the limit switch remains in the center, the monitoring of the data continues and the program cycle is repeated.

The implementation of the control module and the programming of the microprocessor according to the sequence illustrated in the flow diagram of FIG. 2, as well as the design of the control and display panel are accomplished according to techniques well known in the electronic and data processing arts.

While the preferred embodiment of the invention has been described, modifications can be made and other embodiments may be devised without departing from the spirit of the invention and the scope of the appended claims.

What is claimed is:

1. In a signal monitoring and exceeded limit detecting system in which the current value of an incoming signal is monitored and compared to a preset limit value, an improvement for facilitating the setting and adjustment of said limit value, said improvement comprising:
   a three-position switch, including a home center position, a right-hand position, and a left-hand position;
   said switch being biased to resiliently return to the neutral position when not manually held to one of said right and left positions; and
   wherein said limit value is incrementally changed in a first direction when said switch is held in said right position, and incrementally changed in a second direction when said switch is held in said left position wherein said switch further includes a keyed hole, and a key insertable into said hole and manipulable to move and hold said switch in one of said right and left positions; and a vehicle tilt monitoring apparatus wherein said increment signal is proportional to the degree of lateral tilt of said vehicle.

2. The improvement of claim 1 which further includes means for moving said limit value by first discrete increments at first periodical intervals when said key is held in one of said right and left positions.

3. The improvement of claim 2 which further includes means for moving said limit value by second discrete increments at second periodical intervals above a first preset threshold of said limit value.

4. The improvement of claim 1 which further includes means for disabling said system when said limit value is raised above a second preset threshold.

5. The improvement of claim 1 which further includes means for displaying said current value and said limit value.

6. The combination of claim 1 wherein said vehicle comprises a cargo dumping mechanism, and means for disabling said mechanism when said current value exceeds said limit value.

* * * * *